Dec. 24, 1963 T. SPURRIER 3,115,362
CAMPING KIT
Filed Oct. 2, 1962 2 Sheets-Sheet 1

INVENTOR.
TIM SPURRIER
BY
Sherman Levy ATTORNEY

Dec. 24, 1963 T. SPURRIER 3,115,362
CAMPING KIT
Filed Oct. 2, 1962 2 Sheets-Sheet 2
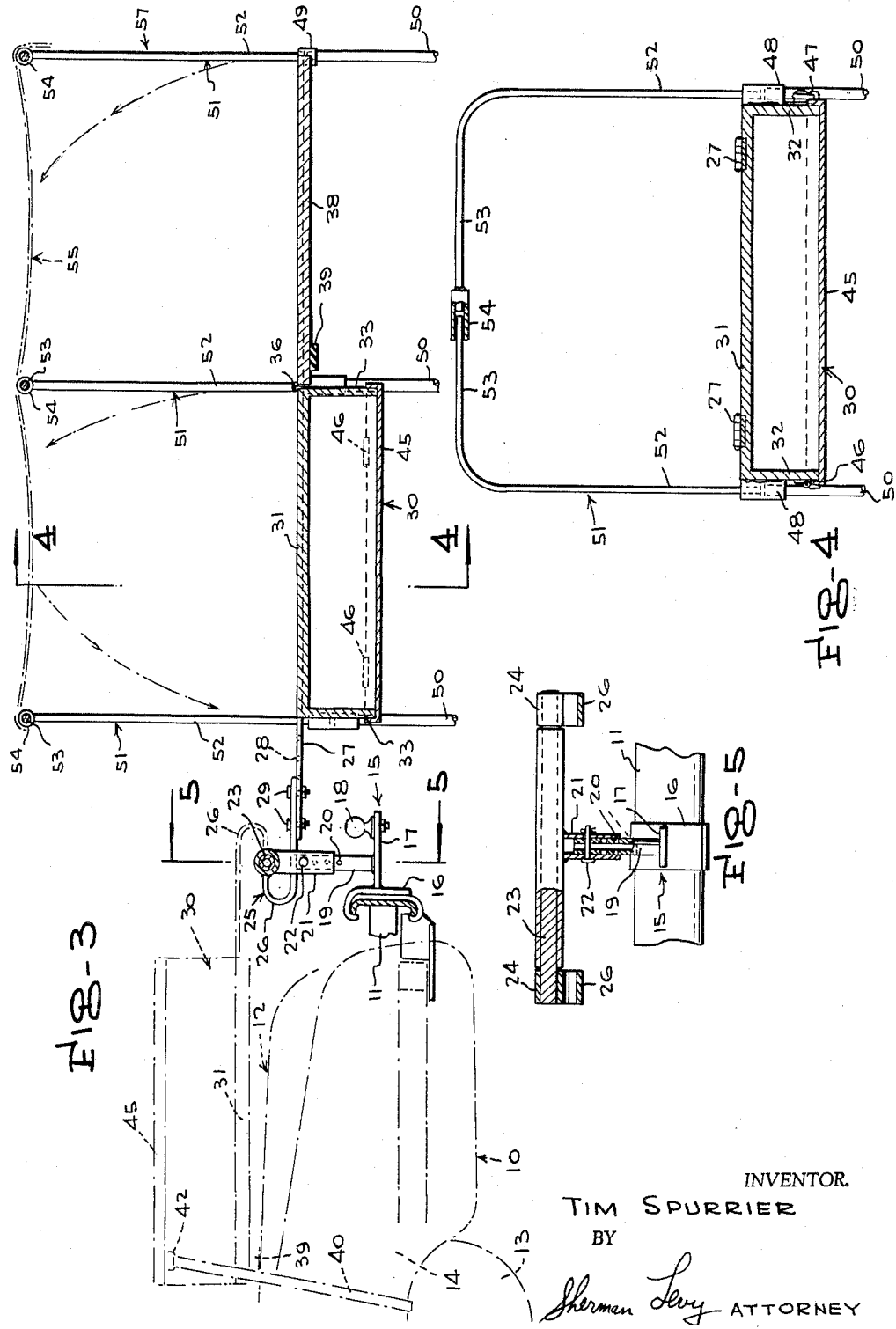
INVENTOR.
TIM SPURRIER
BY
Sherman Levy ATTORNEY

United States Patent Office 3,115,362
Patented Dec. 24, 1963

3,115,362
CAMPING KIT
Tim Spurrier, 734 Butternut, Abilene, Tex.
Filed Oct. 2, 1962, Ser. No. 227,822
2 Claims. (Cl. 296—23)

This invention relates to a camping unit or kit, and more particularly to a camping kit which is adapted to be connected to and used in conjunction with a vehicle such as an automobile.

The primary object of the present invention is to provide a camping kit wherein in one position the camping kit can be arranged to overlie the rear trunk compartment of a vehicle, and wherein when desired the kit can be opened and extended so that it can be conveniently and readily moved to a position for support upon the ground.

A further object is to provide a camping kit of the type stated which is adapted to be folded and conveniently mounted above the trunk compartment of the vehicle when traveling, and wherein when desired, the kit can be opened and extended to permit convenient use thereof for various purposes such as for bedding, or for providing a tent, table or the like.

Still another object is to provide such a camping kit that is economical to manufacture and efficient in use and which is rugged in structure and foolproof in operation.

These and other objects of the invention will become apparent from a reading of the following specification and claims, together with the accompanying drawing, wherein like parts are referred to and indicated by like reference characters and wherein:

FIG. 3 is a sectional view taken on the line 3—3 of FIG. 1.

FIG. 4 is a sectional view taken on the line 4—4 of FIG. 3.

FIG. 5 is a sectional view taken on the line 5—5 of FIG. 3.

Figure 2:
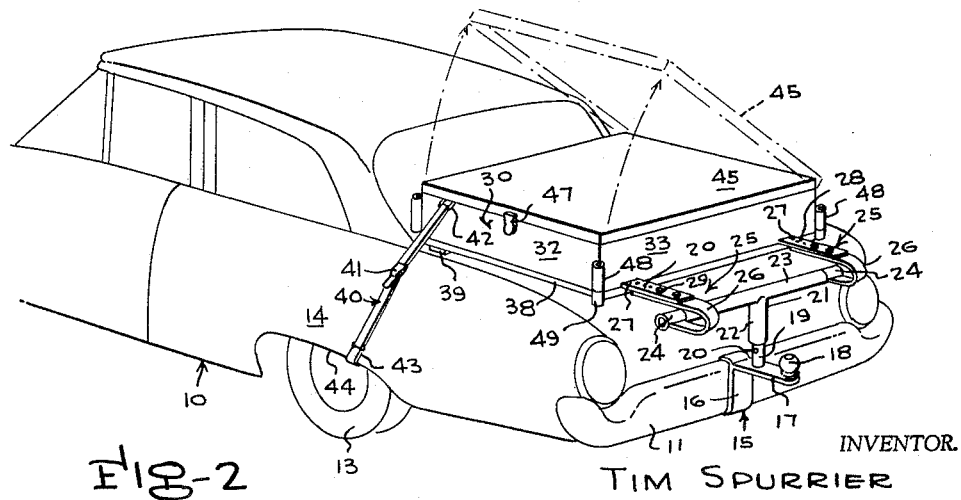
FIG. 2 is a perspective view showing the camping kit in folded position mounted above the trunk compartment of a vehicle as, for example, during periods of traveling.

Referring in detail to the drawings, the numeral 10 indicates a portion of a conventional vehicle such as an automobile which includes a frame 11 as well as a rearwardly disposed trunk 12 and rear wheels 13 and rear fenders 14. As shown in FIG. 2 for example a trailer hitch 15 is connected to the rear portion of the frame 11 in a suitable manner, and the trailer hitch 15 is adapted to include an upstanding portion 16 as well as a horizontal portion 17 which has a bar member 18 suitably affixed thereto as, for example, for use when a trailer is being towed behind the vehicle 10.

The numeral 19 indicates an upright member which is secured as by welding to the horizontal portion 17 of the trailer hitch 15, and the upright member 19 is adapted to have a plurality of openings or apertures 20 therein for a purpose to be later described. A vertically disposed tubular element 21 is adjustably or telescopically connected to the upright member 19, and a pin 22 is adapted to be extended through openings in the element 21 and through certain of the registering openings 20 in the member 19 for maintaining the parts 21 and 19 immobile in their adjusted position, FIG. 5.

As shown in the drawings, a horizontally disposed rod 23 is secured as by welding to the upper end of the tubular element 21, and the rod 23 has sleeves or collars 24 swivelly or pivotally mounted on the ends thereof. A pair of brackets 25 are provided, and the brackets 25 include curved portions or members 26 which are secured to or formed integral with the sleeves 24.

There is further provided a pair of spaced parallel bars 27 which have a plurality of spaced apart apertures or openings 28 therein, FIG. 3, and the numerals 29 indicate securing elements such as bolts which are adapted to extend through certain of the apertures 28 and through the members 26 and this construction provides a means for adjusting the position of the bars 27 relative to the members 26. That is, by loosening the bolts 29 and then positioning these bolts in the proper openings 28, the position of the bars 27 relative to the members 26 can be changed or varied as desired or required.

The numeral 30 indicates a hollow body unit which includes a wall member 31 that is adapted to be secured to the bars 27 in any suitable manner, as for example by means of securing elements or screws 34. The body unit 30 further includes spaced parallel vertically disposed side walls 32 and spaced parallel vertically disposed end walls 33.

Figure 1:
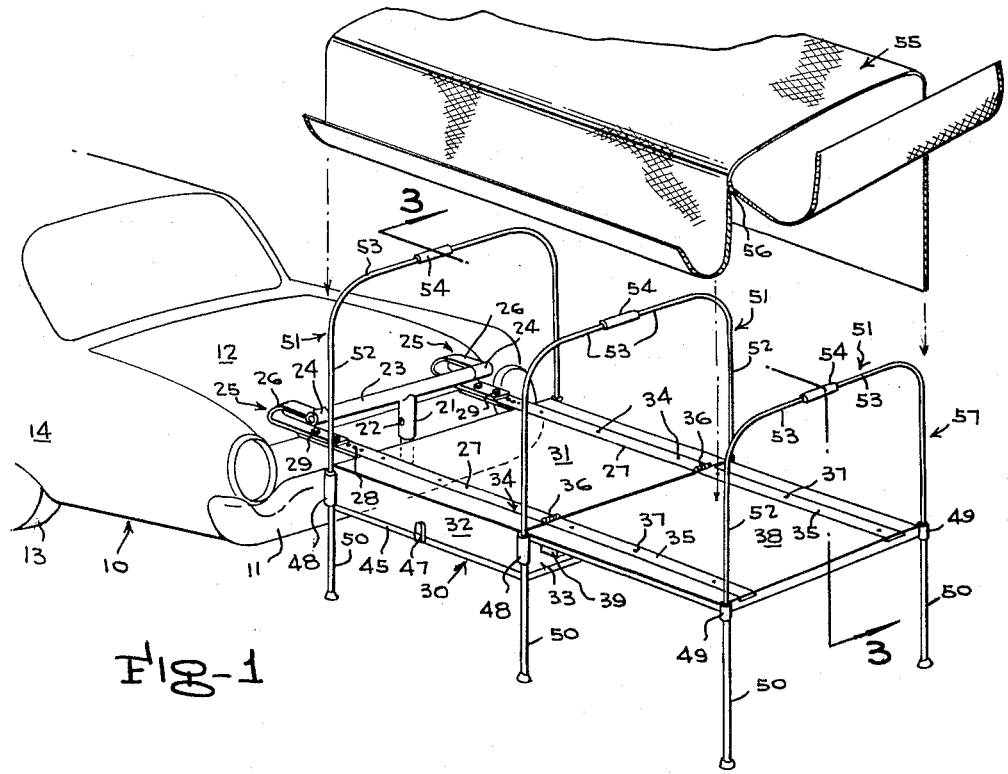
FIG. 1 is a perspective view showing the camping kit in extended position, and with parts broken away and in section.

A pair of spaced parallel braces 35 are adapted to be hingedly connected to the bars 27 as, for example, by means of hinges 36, FIG. 1, and a platform 38 is suitably affixed to the braces 35 as at 37.

The numeral 39 indicates a padding strip which is adapted to be secured to the platform 38 in any suitable manner, and the padding strip 39 is adapted to be used for helping to prevent marring or damage to the body of the vehicle 10, as for example when the parts are in the position of FIG. 2.

With the parts arranged as shown in FIG. 2, webbing straps 40 are adapted to be used for maintaining the camping kit in folded traveling position, and the webbing straps 40 may be provided with adjustable buckles 41. An end of a webbing strap 40 may be connected to the body unit 30 as at 42, and the other end of the webbing strap 40 is adapted to be connected to or arranged in engagement with the lower edge portion 44 of a side fender 14 as for example through the medium of or by means of an element or hook 43, FIG. 2.

There is further provided a closure 45 which is hingedly connected to the body unit 30 as, for example, by means of hinges 46, and a latch or keeper 47 is provided for selectively retaining or maintaining the closure 45 in closed position relative to the hollow body unit 30.

The numerals 48 and 49 indicate sockets or collars which are suitably connected to the body unit 30 and the platform 38, and when the parts are in the position of FIG. 1, vertically disposed legs 50 are adapted to depend from and engage the sockets 48 and 49. The numerals 51 indicate support elements which include vertical portions 52 that are arranged in engagement with the sockets 48 and 49, and the support elements 51 further include horizontal portions 53 which are adapted to be coupled together as at 54 so as to provide a framework 57 which can be used for conveniently supporting a cover member such as the cover member 55. The cover member 55 may be provided with accessories such as slide fasteners 56 for facilitating the opening or use thereof.

From the foregoing, it will be seen that there has been provided a camping kit, and in use with the parts arranged as shown in the drawings, when traveling, the parts are adapted to be arranged as shown in solid lines in FIG. 2. When the destination is reached, the parts are adapted to be extended or moved from the position shown in FIG. 2 to a position such as that shown in FIG. 3.

With the parts arranged as shown in FIG. 2, the straps 40 help anchor or maintain the folded assembly connected in place since the straps 40 are connected as at 42 and 43 to the body unit 30 and lower edge 44 of the rear fender 14. The padding 39 which may be made of a suitable material such as rubber or plastic helps prevent damage to the surface of the vehicle body when the parts are in the position of FIG. 2. The latch 47 serves to maintain the closure 45 in closed position relative to the hollow body unit 30, and the hollow body unit 30 provides a convenient storage space or area for various accessories or parts such as the legs 50, members 51, cover 55, and the like, as for example when these parts are not being used. Also, with the parts in the position of FIG. 2, there is no interference with the trailer hitch 15, so that the trailer hitch 15 can be used for towing or pulling a trailer in the usual manner.

When it is desired to use the camping kit, such a trailer can be disconnected from the hitch 15, and then the catch 47 can be disengaged so as to permit the closure 45 to pivot or swing open on its hinges 46, whereby the member 30 can be emptied of all the squipment therein. Next, the webbing straps 40 are released, and the legs 50 can be installed in the sockets 48, and then the kit is pivoted about an axis extending through the rod 23 until the legs 50 rest on the ground. Then, the platform 38 is moved up and back and down until the legs for the platform rest on the ground, and at this time the platform 38 and wall portion 31 are coplanar and are arranged in a horizontal position as, for example, as shown in FIGS. 1 and 3. The framework 57 including the elements 52 are then adapted to be connected to the sockets 48 and 49 and assembled together by means of the collars 54 so that the parts 38 and 31 are now ready for bedding or the like, and the framework 57 can be used to support a tent or the like, can be turtle back when the vehicle is accessible.

When the camping kit is to be made ready for traveling, a reverse procedure is followed from that described in connection with the unfolding or setting up thereof, so that the parts can be returned from a position such as that shown in FIGS. 1 and 3 to a position such as that shown in FIG. 2, and those parts which are disconnected or disassembled can be conveniently stored in the hollow member 30, and also any other equipment or accessories desired or required can be conveniently stored in the hollow body unit 30.

The entire procedure of moving the kit to folded or extended position takes only a short amount of time and very little effort and is readily accomplished.

Also, the present invention includes adjustable features so that the device will readily fit various different types of vehicles or automobiles. For example, the bolts 29 can be removed so as to permit relative adjustment between the parts 26 and 27, and then these bolts 29 can be reinserted through the proper openings in order to provide a means for changing the relative position between these parts. Similarly the pin 22 can be removed and the element 21 can be raised or lowered relative to the element or member 19, and then the pin 22 can be reinserted through the proper registering openings in order to maintain these parts stationary in their desired adjusted position.

The parts can be made of any suitable material and in different shapes or sizes.

It will therefore be seen that according to the present invention there has been provided a portable camping kit wherein a mounting means is adapted to be secured to the rear bumper or rear portion of the frame of a vehicle for swingably supporting a luggage carrier or bed which is movable to a position to overlie the rear trunk compartment of the vehicle, as well as being movable to a position for support upon the ground. The kit is highly versatile, and the unit 30 is roomy and provides a convenient space for storing various types of equipment or accessories.

The padding strip 39 serves to protect the finish of the automobile body. The webbing strap 40 is adapted to be hooked to the fender and drawn up tight. The member 45 functions as an access lid to the camping equipment. The camping kit containing the legs for the platform, the framework, and the tarpaulin 55 for the tent, are arranged so that such parts can be conveniently stored in the member 30 when desired or required, and in addition extra space is provided for the camper's own equipment such as bedding and the like. The trailer hitch 15 is adapted to be mounted to the frame of the automobile with an adjustable height construction including the members 19 and 21 to make the kit adjustable to any make of automobile. The gooseneck adjustment including the elements 29 provides a means for adjusting the length thereof as desired or required. FIG. 2 illustrates the camping kit in the traveling position, while FIGS. 1 and 3 illustrate the camping kit in camping position.

When setting up the platform, first the member 30 is adapted to be emptied of all equipment, and then the webbing straps 40 are released, and the legs can be installed in the sockets, and then the member 30 is adapted to be folded up and back and down until the legs rest on the ground, and the legs for the sockets 49 can then be installed, and then the member 38 can be folded up back and down until the legs 50 which engage the sockets 49 rest on the ground. The platform is now ready for bedding and the framework 57 is ready for the tent, and the trunk compartment or back portion of the vehicle is conveniently accessible.

The parts such as the parts 30 and 38 can be made of a suitable material such as relatively thick plywood, or else the parts can be made of a suitable metal, plastic or the like. The legs can be made so that the height thereof is adjustable. The bows 51 are separable and are adapted to be selectively held together at the top with the collars 54. The bows 51 can be used for supporting tarpaulin material, insect netting or the like.

Minor changes in shape, size and rearrangement of details coming within the field of invention claimed may be resorted to in actual practice, if desired.

What is claimed is:

1. A portable camping kit for use with a vehicle of the type that includes a frame and a rearwardly disposed trunk compartment and rear fenders, a trailer hitch connected to said frame, an upright member affixed to said trailer hitch, a tubular element adjustably connected to said upright member, a horizontally disposed rod affixed to the upper end of said tubular element, sleeves pivotally mounted on said rod, brackets including curved portions affixed to said sleeves, bars adjustably connected to said brackets, a body unit including a wall member affixed to said bars, said body unit further including side walls and end walls, a pair of spaced parallel braces hingedly connected to said bars, a platform affixed to said braces, a padding strip connected to said platform, webbing straps connected to said body unit and said webbing straps adapted to engage the lower edge portions of the rear fenders of the vehicle, a closure hingedly connected to said body unit, a latch for selectively maintaining the closure in closed relation relative to the body unit, sockets connected to said body unit and platform, legs for engaging said sockets, support elements having vertically disposed sections for engaging said sockets, and said support elements including horizontally disposed upper portions which are releasably coupled together by collars, and a cover member on said support elements.

2. A portable camping kit for use with a vehicle of the type that includes a frame and a rearwardly disposed trunk compartment and rear fenders, a trailer hitch connected to said frame, an upright member affixed to said trailer hitch, a tubular element adjustably connected to said upright member, a horizontally disposed rod affixed to the upper end of said tubular element, sleeves pivotally mounted on the ends of said rod, brackets including curved portions affixed to said sleeves, bars adjustably connected to said brackets, a hollow body unit including a wall member affixed to said bars, said body unit further including spaced parallel vertically disposed side walls and spaced parallel vertically disposed end walls, a pair of spaced parallel braces hingedly connected to said bars, a platform affixed to said braces, a padding strip connected to said platform, webbing straps connected to said body unit and said webbing straps adapted to engage the lower edge portions of the rear fenders of the vehicle, a closure hingedly connected to said body unit, a latch for selectively maintaining the closure in closed relation relative to the body unit, sockets connected to said body unit and platform, legs for engaging said sockets, support elements having vertically disposed sections for engaging said sockets, and said support elements including horizontally disposed upper portions which are releasably coupled together by collars, and a cover member on said support elements.

References Cited in the file of this patent

UNITED STATES PATENTS

| | | |
|---|---|---|
| 2,642,587 | Taylor | June 23, 1953 |
| 2,907,077 | Pugsley | Oct. 6, 1959 |
| 2,937,651 | Van Tassel | May 24, 1960 |